United States Patent [19]
Chen et al.

[11] Patent Number: 5,378,665
[45] Date of Patent: Jan. 3, 1995

[54] CRYSTALLINE YTTRIUM ALUMINATE AND PROCESS FOR MAKING

[75] Inventors: Kuo-Chun Chen, Carlsbad; Khodabakhsh S. Mazdiyasni, Alpine, both of Calif.

[73] Assignee: General Atomics, San Diego, Calif.

[21] Appl. No.: 969,428

[22] Filed: Oct. 30, 1992

[51] Int. Cl.$^6$ .................. C04B 35/50; C04B 35/10
[52] U.S. Cl. ..................... 501/95; 501/152; 501/153; 501/86; 501/12; 501/127; 423/600; 423/263
[58] Field of Search .............. 501/12, 152, 127, 86, 501/153, 95; 423/600, 263

[56] References Cited

U.S. PATENT DOCUMENTS

| | | | |
|---|---|---|---|
| 4,732,878 | 3/1988 | Everitt et al. | 501/100 |
| 4,752,878 | 3/1988 | Evaritt et al. | 501/100 |
| 4,757,036 | 7/1988 | Kaar | 423/600 |
| 4,824,623 | 4/1989 | Rambosek | 264/60 |
| 4,861,737 | 8/1989 | Prud'Homme van Reine et al. | 423/600 |
| 5,196,388 | 3/1993 | Shyu | 501/153 |
| 5,217,933 | 6/1993 | Budd et al. | 501/152 |

OTHER PUBLICATIONS

Sowman et al., "Oxide fibers from chemical ceramic processes," *Fiber Reinforced Ceramic Composites: Materials, Processing and Technology*, K. S. Mazdiyasni, Ed., pp. 122–140 (1990).

Sakka et al., "The Sol-Gel transition in the hydrolysis of metal alkoxides in relation to the formation of glass fibers and films," *J. of Non-Crystalline Solids*, 48:31–46 (1982).

de With et al., "Translucent $Y_3Al_5O_{12}$ ceramics," *Mat. Res. Bull.*, 19:1669–1674 (1984).

Marshall et al., "High-strength zirconia fibers," *J. of American Ceramic Society*, 70(8):C-187-C-188 (1987) No Month.

Parthasarathy et al, "Creep Mechanism of Polycrystalline Yttrium Aluminum Garnet" *J. Am. Ceram. Soc.*, 75(7), 1–4, Jul. 1992.

Masdiyasni "Powder synthesis from metal–organic precursors," *Ceramics International* 1982, 8(2); 42}No Month.

*Primary Examiner*—Mark L. Bell
*Assistant Examiner*—C. M. Bonner
*Attorney, Agent, or Firm*—Fitch, Even, Tabin & Flannery

[57] ABSTRACT

Ceramic yttrium aluminate fibers are produced by processes that result in the formation of a microcrystalline ceramic oxide structure. In one process, a stoichiometric amount of a yttrium alkoxide is mixed with an aluminum alkoxide to produce a homogeneous mixture in an alcohol solvent. Following the addition of an alkoxide precursor of $ZrO_2$ or of $HfO_2$, the optional addition of an alkoxide precursor of MgO, and the subsequent addition of an organic acid, hydrolytic condensation to produce a suitable sol is accomplished by adding water. A slight excess of yttrium alkoxide can be used instead of the MgO precursor. The viscosity of the sol is adjusted to form a tractable gel that is spun into fibers which, after curing and firing, are shown to be microcrystalline in form, the resulting fibers having a submicron average grain size. Strength and stability result from the presence of solid particles of partially stabilized zirconia or hafnia at the grain boundaries and the triple points. The fibers exhibit good tensile strength at high temperatures and can be employed to make ceramic composites having excellent resistance to high-temperature creep.

19 Claims, No Drawings

CRYSTALLINE YTTRIUM ALUMINATE AND PROCESS FOR MAKING

FIELD OF THE INVENTION

The present invention relates to yttrium aluminate and other similar oxide ceramics and to processes for making fibers of yttrium aluminate. More specifically, the invention relates to microcrystalline yttrium aluminate having the formula $Y_3Al_5O_{12}$ (YAG) and to processes for preparing stabilized microcrystalline YAG by a hydrolysis-condensation reaction which is carried out with a homogeneous mixture of an aluminum alkoxide and a yttrium alkoxide. More particularly, the present invention finds particular use in the production of ceramic YAG fibers exhibiting high strength and creep resistance, and such fibers allow the making of ceramic composites having improved physical properties.

BACKGROUND OF THE INVENTION

In the last 15 years or so, the literature has been replete with descriptions of various microcrystalline or non-vitreous fibers and other shaped objects prepared from refractory metal oxides which objects are made by various non-melt processes. One process that has received a fair amount of attention in recent years is the production of fibers by extruding, drawing or spinning viscous fluids prepared from metal or metalloid alkoxides, which production processes are often referred to as sol gel processes. In 1982, it was described how sols and high-purity, dense microparticles of a variety of ceramic oxides could be prepared from alkoxides, K. S. Mazdiyasni, *Ceramics International*, 8, 2, 42–55 (1982). Fibers or other extruded objects prepared from such sols are generally dried at intermediate temperatures to remove solvents and other volatile organic substances and then fired at high temperatures to calcine the remaining organic materials to produce the desired refractory articles. With respect to making crystalline fibers from organic precursors, U.S. Pat. Nos. 4,732,878 and 4,924,623, and the art cited in those patents, are pertinent, disclosing various processes for making crystalline fibers of this general type from sols.

Most recently, there has been a search for such high-temperature-resistant fibers that can be used to endow ceramic composite materials and the like with good creep resistance at such high temperatures. Although there are a variety of fibrous ceramic materials available from a number of different commercial manufacturers that are generally useful for ceramic matrix reinforcement, none of these fibers has all of the properties desired, and thus the search continues for improved fibers that exhibit high strength, high temperature resistance and particularly good creep resistance. Although oxide-based ceramics have continued to be shown much interest because of their inherent oxidation-resistance at high temperatures, other non-oxide ceramic fibers have thus far shown superior creep resistance and thus have been the focus of continuing development because of this favorable property, A number of oxide fibers have been developed and are now commercially available, including the FP family of fibers marketed by DuPont, the Nextel family of fibers marketed by Minnesota Mining and Manufacturing, Saffil fibers available from ICI, and Saphikon fibers from Saphikon and Sumika fibers from Sumitomo. However, until fairly recently, such available oxide fibers have tended to chemically bond tightly to the ceramic matrices, and they have been inappropriate for this reason because composites would behave more like monolithic ceramics and would fail under stress in a brittle-like manner. Because coatings for such fibers have progressed, new interest has been shown in oxide fibers for these purposes, and presently both Nextel 312 fibers and fiber FP are available with silicon dioxide coatings. However, even though such improved coatings alleviate the problem with regard to brittleness, creep resistance continues to remain a significant problem for these fibers.

One process often used for preparing high purity mullite powder ($3Al O_3 \cdot 2SiO_2$) is that of hydrolytically decomposing a mixture of aluminum and silicon alkoxides, wherein the hydrolytic condensation reactions are carried out in the presence of ammonium hydroxide or in the presence of dilute mineral acid with the formation of a hydroxy-aluminosilicate. Such material can be caused to precipitate in the form of white power which can then be dried and fired to produce polycrystalline mullite.

The '878 patent teaches making mullite fibers from an alkoxide mixture of this general type by creating a sol that, after appropriate adjustment of viscosity, is extruded or spun to create fibers; these green fibers are then dried and calcined or fired to achieve the ceramic crystalline form. An article by S. Sakka et al., *J. Non-Crystalline Solids*, 48, 31–46 (1982) discussed catalysts for alkoxide condensation reactions to produce a viscous liquid sol useful to spin silica and silica-based fibers.

In addition to mullite-based and other silica-based fibers, the search continued to high-strength oxide fibers to reinforce ceramic and metal matrix composites, and in 1987, there was a publication entitled High-Strength Zirconia Fibers, D. D. Marshall, et al., *J. Am. Ceram, Soc.*, 70, 8, C-187–C-188 (1987). This article reported the fabrication of high-strength $Y_2O_3$-doped $ZrO_2$ fibers from a metastable, acetate-based precursor. The 1990 publication *Fiber Reinforced Ceramic Composites*, edited by K. S. Mazdiyasni, Noyes Publications, includes Chapter 5, entitled "Oxide Fibers from Chemical Ceramic Processes", wherein many such processing techniques are surveyed.

Despite these early successes, the search has still continued for improved ceramic oxide fibers and particularly for fibers that would exhibit good creep resistance at high temperatures so as to facilitate their use as reinforcing fibers in ceramic composite materials. It was well known that yttrium alumina garnet (YAG), $Y_3Al_5O_{12}$, was a material that exhibits long-term thermochemical stability and reasonable mechanical properties at high temperatures. In a 1984 article, G. de With, *Mat, Res. Bull.*, 19, 1669–1674, reported that spray-dried particles of YAG could be sintered to dense, translucent shapes using dopants such as $SiO_2$, MgO or possibly $ZrO_2$. However, the production of YAG fibers having high temperature stability and good creep resistance has not previously been achieved.

In view of the foregoing, efforts have continued which are directed to the production of microcrystalline YAG material having improved creep resistance while retaining other desired high temperature properties, with particular emphasis being focused on the production of oxide fibers which not only will exhibit good heat resistance, but which can be used as reinforcing fibers to impart high creep resistance to ceramic composite materials.

SUMMARY OF THE INVENTION

The present invention provides stabilized microcrystalline YAG and processes for preparing it or other similar ceramic oxide materials having minute inorganic particles of nanometer size at grain boundaries between adjacent microcrystals and at the triple points, preferably by the in situ formation of such nanoparticles. More specifically, the invention preferably accomplishes this desired result by forming a homogeneous liquid mixture of an organoaluminum compound and an organoyttrium compound, wherein yttrium is present in the stoichiometric ratio (or in a slight excess over the stoichiometric ratio) of yttrium to aluminum in YAG. Either zirconium alkoxide or hafnium alkoxide is preferably added to these components, and then an organic acid is added to block the reactivity of some of the groups. The mixture is then caused to undergo hydrolytic condensation and polymerization to form a precursor sol gel, which is optionally treated to assure uniformity and then processed into pre-ceramic, solid-phase YAG material, preferably fibers. Solvent is removed, as by evaporation, from the pre-ceramic solid-phase fibers to make the fibers handleable. A heating process is then preferably carried out to first totally dry these shapes by removing remaining solvent and volatile organics, and then the dried shapes are cured at about 250° C. to about 500° C. They are then fired at pyrolyzing temperatures to create microcrystalline YAG having in situ-derived nanometer-sized particles of partially stabilized zirconia or hafnia located at the grain boundaries between microcrystals, and particularly at the triple points where 3 microcrystals come together, and are then sintered. These minute, in situ-derived particles preferably range from about 1 nanometer to about 10 nanometers in size and are sometimes referred to as "nanoparticles". The nanoparticles effectively function as grain boundary pinners. As a result, ceramic composites made with fibers of this YAG microcrystalline material having these strategically located, partially stabilized $ZrO_2$ or $HfO_2$ particles exhibit a substantial improvement in high temperature creep resistance, whereby the employment of these fibers in such composites is considered particularly advantageous.

DETAILED DESCRIPTION OF THE PREFERRED EMBODIMENTS

Primary applications of advanced ceramic matrix composites are presently expected to be in oxidizing environments, and it is believed that oxidation-resistance and creep-resistance of the reinforcing fibers will likely be of prime importance. YAG or other similar ceramic oxide fibers can be formed from metal or metalloid alkoxide precursors using what is termed a sol gel process. The making of the ceramic oxide microcrystalline fibers of the invention is preferably accompanied by the in situ generation of nanoparticles of partially stabilized $ZrO_2$ or $HfO_2$ which will be present at grain boundaries between microcrystals; however, such solid nanoparticles can be separately prepared and then uniformly dispersed throughout an alkoxide mixture prior to condensation and polymerization.

The principles of the present invention may also be applicable to produce, in addition to high density YAG $Y_3Al_5O_{12}$), satisfactory fibers of various similar microcrystalline ceramic oxide materials, including alumina, zirconia, thoria, magnesia, zirconium silicate, aluminum silicate, titania, yttria and spinel.

Microcrystalline ceramic oxide YAG fibers having minute partially stabilized metal oxide grain boundary pinners, substantially uniformly dispersed therethroughout, are preferably produced from sols of metal alkoxides, which sols may be formed as generally taught in the earlier identified '878 and '623 patents, the disclosures of which are incorporated herein by reference. Appropriate sols for making ceramic oxides are also disclosed in the *Ceramics International* article, supra. More specifically, solutions of mixed alkoxides are preferably formed, using appropriate organic solvents or solvent mixtures, in which the metal components are present in about the desired stoichiometric ratios with respect to the ultimate crystalline oxide materials. These homogeneous mixtures are then concentrated, as by evaporation, and/or otherwise appropriately treated, prior to adding water, as well known in this art, to cause colloidal oxide particles to eventually form and produce a viscous, tractable precursor sol that can then be shaped into the desired form, i.e. fibers.

Metal alkoxides are preferred for use in making the sols that serve as the precursors for the improved microcrystalline ceramic oxide fibers, and these generally include alkoxides of Y, Al, Zr, Hf and Mg. The alkyl groups that are chosen to form the alkoxides are generally the lower alkyls ($C_1$ to $C_6$), e.g. methyl, ethyl, n-propyl, isopropyl, n-butyl, sec-butyl and t-butyl. Alternative compounds that might be used include other known soluble organometallic salts, e.g. aluminum formoacetate; however, the alkoxides are preferred, particularly the isopropoxides.

The alkoxides are soluble in organic solvents, such as alcohols, and they are preferably employed as alcohol solutions. They are conveniently used in an excess amount of the alcohol that corresponds to the alkyl group of the alkoxide, and preferably from about 1 to 3 moles over the amount of alcohol necessary to dissolve the alkoxides are used. Alcohol solvents are normally mutually soluble in each other; therefore, aluminum alkoxides and yttrium alkoxides can be provided as solutions in different alcohols to form a sol for producing YAG if desired, but usually the same alcohol is used.

Microcrystalline YAG materials are made from sols of mixed alkoxides having the appropriate stoichiometric ratio of aluminum to yttrium. Thus the particular alcohol solutions of the alkoxides are mixed together in the appropriate amounts to provide the desired ratio; however, as discussed hereinafter, it is preferred that a slight excess of yttrium is provided to partially stabilize the $ZrO_2$ or $HfO_2$ unless an appropriate amount of a magnesium alkoxide is provided. The improved microcrystalline YAG fibers produced by the invention contain between about 0.1 and about 2 weight percent, preferably between about 0.2 and about 1.5 weight percent, and most preferably between about 0.4 and about 1 weight percent, of nanoparticles of partially stabilized $ZrO_2$ or $HfO_2$ which are located at grain boundaries between the microcrystals and at triple points.

These nanoparticles may be separately produced and then added to the stoichiometric mixture of aluminum and yttrium alkoxides and mechanically dispersed uniformly therethroughout prior to condensation and polymerization. Processes for making such nanoparticles are known in the art, and exemplary processes are described in the 1982 *Ceramics International* article, supra.

Preferably, however, the nanoparticles are formed in situ from suitable precursors compatible with the yttrium and aluminum precursors which are used. When yttrium and aluminum alkoxides are being used to form YAG fibers, zirconium or hafnium alkoxides are the preferred oxide precursors.

The nanoparticles are referred to as partially stabilized zirconia or hafnia, and this partial stabilization results from the combination of predetermined amounts of either yttria or magnesia with the zirconia or hafnia so as to create a partially tetragonal crystalline structure. When magnesia is used to partially stabilize either zirconia or hafnia, the magnesia is preferably present in an amount between about 6 and about 8.5 atom percent of magnesium based upon total atoms of magnesium plus zirconium or hafnium in the nanoparticles. When yttria is used to stabilize either zirconia or hafnia, yttria is preferably provided in an excess, over the stoichiometric amount that will combine with the alumina to create the YAG crystalline structure, so that it will be present in the nanoparticles in an amount between about 1.5 and about 3 atom percent of yttrium, based upon total atoms of yttrium plus either zirconium or hafnium. Alkoxides of Zr, Hf and Mg formed with alcohols having from 1 to 6 carbon atoms ($C_1$-$C_6$) are generally used.

Metal alkoxides for use in these processes are formed using methods well known in this art. For example, solutions of yttrium isopropoxide in isopropanol are prepared by reacting yttrium metal chips in dry isopropanol, using a small amount of mercuric chloride as a catalyst, and then refluxing at about 82° C. until the reaction is complete. Following filtering of the mixture to obtain a clear solution, it is stored under a nitrogen atmosphere. Solutions of aluminum isopropoxide in isopropanol are similarly prepared by reacting aluminum metal foil in dry isopropanol, using a small amount of mercuric chloride as a catalyst, and then similarly filtering and storing under nitrogen. Zirconium alkoxides, such as zirconium isopropoxide, zirconium n-propoxide, zirconium n-butoxide and the like are available commercially. Hafnium alkoxides, such as hafnium isopropoxide and n-propoxide, are also commercially available. Solutions of magnesium alkoxide, such as magnesium ethoxide or magnesium isopropoxide, are synthesized by reacting magnesium metal with the appropriate anhydrous alcohol under similar conditions. Other magnesium alkoxides which can alternatively be used include magnesium n-propoxide, magnesium 2-methoxyethoxide, and magnesium 2,2-ethoxyethoxyethoxide.

Calculated amounts of yttrium and aluminum alkoxide solutions are measured by weight or by volume and mixed to create a first solution wherein the atomic ratio of yttrium and aluminum is about 3 to 5, which will give the final ceramic composition $Y_3al_5O_{12}$. To an amount of such a solution measured to produce one mole of YAG, there is preferably added between about 0.05 and about 0.3 mole of either $ZrO_2$ or $HfO_2$ (in the form of the alkoxide) plus between about 0.004 and about 0.03 mole of either MgO or $Y_2O_3$ (also in the form of the alkoxide) in order to provide the desired amount of partially stabilized zirconia or hafnia in the final ceramic composition. This first solution is then refluxed at boiling conditions under nitrogen at atmospheric pressure and a temperature of about 82° C. for about 1 hour.

This mixing via refluxing assures that homogeneity is achieved throughout the alkoxide mixture and that it will eventually form a uniform, stable sol. If desired, minor amounts of sol stabilization agents, such as lactic acid or dimethyl formamide, can be added. As indicated above, the main two alkoxide components are added in the appropriate molar amounts so that the resultant sol will contain 3 atoms of yttrium to each 5 atoms of aluminum, i.e. the stoichiometric ratio, but may optionally contain a slight excess of the yttrium alkoxide.

Refluxing of the mixed alkoxide solution at its boiling point under nitrogen at atmospheric pressure for about 1 to 2 hours is considered sufficient to ensure thorough mixing and the creation of a homogeneous solution; alternatively, refluxing by bubbling dry nitrogen through the solution for a period of from about 8 to about 24 hours at room temperature may be used. After the homogeneous alkoxide solution is formed, containing at least the aluminum alkoxide and the yttrium alkoxide, an appropriate amount of partially stabilized zirconia or hafnia nanoparticles could be added and then appropriately dispersed. Dispersal could be carried out by bubbling dry nitrogen through the particle-containing solution for a period of about 12 hours, which was indicated above as an alternative way of forming the homogeneous alkoxide solution. Alternatively, the nanoparticles could be added following the organic acid addition. However, as earlier indicated, the nanoparticles are preferably generated in situ from zirconia or hafnia alkoxides because in situ generation assures extremely uniform dispersion throughout the microcrystalline fibers.

An organic acid is added in order to appropriately modify the chemical structure of the alkoxides, e.g. isopropoxides, by acting as a blocking agent so that the number of the isopropoxy groups in the yttrium and aluminum isopropoxides is reduced and controlled, preferably to an amount of close to 2 groups per molecule. The decrease of active isopropoxy groups in the solution slows the hydrolysis rates of yttrium and aluminum isopropoxides and, more importantly, controls the structure of the polymeric species after hydrolysis and condensation. With the employment of a suitable blocking agent, rigid three-dimensional networks are avoided, and substantially only two-dimensional chains or cyclic polymeric species result which are preferred for fiber-spinning. An organic acid, preferably 2-ethylhexanoic acid, diluted with one of the alcohols already in the mixture, i.e. dry isopropanol, is added dropwise into the boiling first solution. Other organic acids, such as octantic acid, formic acid, acetic acid or hexanoic acid, can be used; however, 2-ethylhexanoic acid is preferred. The amount of the organic acid used is about 3 to about 12 moles per mole of yttrium alkoxide. The boiling first solution becomes a white suspension, and eventually, after adding the entire amount of organic acid, some white precipitate forms while refluxing is continued for an additional 1-2 hours following such addition.

The use of an organic acid or its equivalent as a blocking agent is preferred because it leaves no inorganic residue that might potentially contaminate the ultimate ceramic oxide product. Equivalents to organic acids for the purposes of blocking agents include compounds such as triethanolamine or the like. In general, the amount of organic acid that is added can vary fairly broadly as indicated above. The amount of organic acid causes a variance in the ultimate viscosity of the solution from which the fiber-spinning is carried out; however, appropriate adjustments can be made by the addition of solvents to achieve the desired viscosity, thus allowing latitude in the amount of organic acid that is employed.

Once mixing is complete following addition of the organic acid, hydrolysis is preferably initiated by the addition of water. For the purpose of initiating hydrolysis and the polymerization and condensation reaction, an appropriate amount of water is added, preferably diluted with one of the alcohols that is already present in the mixture of alkoxide solutions. For example, to the boiling white suspension and precipitate, a calculated amount of water, diluted with dry isopropanol, is added. The amount of water added is preferably equal to about (12-n/2) moles, where n is equal to the moles of organic acid that were added. This hydrolyzed solution continues to contain a white suspension and/or white precipitate as the polymerization and condensation reaction proceeds to completion.

The solvent in the hydrolyzed solution is then optionally, but preferably, removed by using a rotary evaporator with a bath temperature at about 50°–70° C. until almost all the solvent is gone and a damp precipitate is formed. This precipitate is then completely dissolved in a small amount of a non-polar solvent to form a viscous solution. Suitable non-polar solvents include pentane, hexane, heptane, octane, decane, dodecane, 2-methylhexane, 3-methylhexane, 2,3-dimethylpentane, 2,4-dimethylpentane, 2,2,4-trimethylhexane, cyclohexane, methylcyclohexane, ethylcyclohexane, benzene, toluene, m-xylene, p-xylene and o-xylene, and mixtures of these can be used. This viscous solution is then completely dried in an oven or a vacuum oven at about 50°–60° C. till a clear yellowish, brittle, solid mass is formed which is then suitably mechanically reduced to a fine precursor powder. As an alternative, the damp precipitate can be completely dried in a vacuum oven and then powdered without dissolution in such non-polar solvent; however, the step of dissolving in a non-polar solvent is preferred.

When the precursor powder contains about 3 to 6 moles of organic acid per mole of yttrium, such powder is loaded into an alumina crucible and heated in a nitrogen, argon, or helium atmosphere at about 240°–320° C. for about 1–4 hours. When the precursor powder contains more than 6 moles of organic acid per mole of yttrium, this heat treatment step is considered optional. This heat treatment transforms the precursor powders to assure they are soluble in non-polar solvents or in a binary mixture of such a non-polar solvent and an alcohol containing 1–4 carbon atoms. The soluble precursor powders are then dissolved to form a high viscosity solution suitable for fiber-spinning by using an appropriate amount of a non-polar solvent or such a binary solvent mixture.

Generally the amount of the non-polar solvent or the binary mixture of solvents used to form a solution suitable for fiber-spinning depends on the amount of the organic acid in the precursor powder. When only a non-polar solvent is employed, an amount is generally used so that it constitutes between about 10–50 weight percent, and preferably between 20–35 weight percent, of the resultant solution. When a binary solvent mixture is used, which is preferred when 6 moles or less of organic acid were used per mole of yttrium, the amount of non-polar solvent is between about 10–40 weight, and preferably between about 20–30 percent of the solution, and the amount of alcohol in the ultimate solution can be up to about 10 weight percent, but is preferably between about 0.2 and about 5 weight percent of the solution.

For the preparation of fibers, it is preferable to form the damp precipitate and treat it as set forth hereinbefore; however, it may be possible to concentrate the hydrolyzed sol to substantially increase its viscosity and thereby convert it directly to a more viscous liquid that has the form of a tractable gel which can be spun, extruded or otherwise drawn in air to form fibers. Such a hydrolyzed solution can be appropriately caused to undergo evaporation to effect the removal of sufficient solvent to increase its viscosity to a desired level, all as well known in this art.

Preferably, the viscosity of the fiber-spinning solution is adjusted so that the viscosity, at ambient temperatures, is in the range of about 40,000 to about 100,000 cps. Once the desired, tractable sol gel has been achieved, continuous fibers can be spun or extruded from suitable dies containing orifices of the appropriate diameters. Generally the fibers will have diameters in the range of between about 1 to 100 microns (micrometers). Precursor fibers of about 20 to about 50 μm in diameter are preferably spun from such a high viscosity solution. If, for example, fibers having diameters of about 50 microns should be desired, the orifices in the extrusion dies may have diameters of from about 70 to about 100 microns to compensate for the inherent shrinkage which takes place during the spinning and firing of the pre-ceramic fibers. The ultimate fibers preferably have diameters from about 5 μm to about 30 μm.

In a production system, the fibers may be extruded or spun into a drying tower where air-drying of the gel occurs as the fibers float downward via gravity, and upwardly flowing dry air currents can also be provided. Although higher temperatures can be used, generally it is satisfactory to operate such initial air-drying at ambient temperature. These pre-ceramic fibers that are produced, sometimes referred to as green fibers, are stable chemically and possess sufficient mechanical strength for handling.

The precursor fibers are then completely dried by raising their temperature from room temperature at a rate of between about 1 to about 7° C. per minute to a curing temperature of about 250° to about 500° C., preferably to a temperature between about 250° and about 350° C., and more preferably to from about 280° C. to about 320° C. Continuous fibers are heated under slight tension, e.g. about 0.07 gram, and are held at this curing temperature under such tension for about 2 to about 4 hours in an air or an oxygen atmosphere. The rate of drying in the final drying step while raising their temperature to the curing temperature can have some effect upon the shape of the fibers, and accordingly, the relative humidity of the heated air is preferably regulated. Very generally, the relative humidity of the air should not be too high since excess humidity could cause the green fibers to stick together. At the same time, too low relative humidity might cause fiber breakage. Accordingly, relative humidity in the range of about 20 to 60 percent is preferably used.

At the end of this time, the cured fibers are exposed to an inert atmosphere of nitrogen, argon, helium or the like, and their temperature is raised at a rate of between about 3° and about 7° C. per minute until a temperature of about 900° C. to about 1050° C., and preferably about 950° C., is reached. The fibers are then held at this pyrolyzing temperature for about 2 to about 10 hours.

Pyrolysis of the fibers in such an inert atmosphere can, for example, be carried out by heating the cured fibers in a graphite furnace under an argon atmosphere to a suitable pyrolyzing temperature for the YAG or other similar ceramic oxide material. When YAG material is being prepared, heating at a temperature about 950° C. for about 2 hours is preferred.

At the conclusion of pyrolysis, the fibers are in the form of crystalline YAG. They are then again exposed to air, and the temperature is raised at a rate of between about 5 and about 20° C. per minute to a temperature of between about 1500° C. and about 1650° C. The fibers are held at this sintering temperature for a sufficient period of time to cause them to densify, i.e. between about 0.2 and about 4 hours, at the end of which period they should have a density equal to at least about 95% of theoretical maximum density and preferably at least 98%. Examination of representative fibers periodically removed during this schedule of heat treatment shows that the yttrium aluminate ($Y_3Al_5O_{12}$) crystalline structure is obtained when the temperature reaches about 900° C.

The pyrolyzed fibers are preferably taken relatively quickly to the sintering temperature, e.g. at a rate of about 20° C. per minute, and the fibers are held at sintering temperature for a time of about 1 to about 2 hours. For YAG fibers, a sintering temperature of between about 1550° C. and about 1600° C. is preferably employed. At these temperatures, the yttria aluminate retains its microcrystalline form of a regular crystalline lattice indicative of this crystalline oxide. The coherent, solid nanoparticles of partially stabilized zirconia or hafnia remain outside the grain boundaries of the already formed or forming microcrystals of YAG, and it is found that these nanoparticles are strategically located with many of them actually occupying the triple points in the ceramic oxide microcrystalline structure, i.e. the points where boundaries of three different microcrystals converge. As a result of the time of firing at the stated temperature, the microcrystals of YAG are substantially all within a size range of from about 300 to about 700 nanometers, whereas the coherent nanoparticles of partially stabilized zirconia or hafnia range from about 1 nanometer to about 10 nanometers in size, with most of them being from about 1 to about 2 nm.

The YAG fibers are considered to be particularly useful for the production of ceramic composites. To create ceramic composites, the fibers are used in combination with ceramic matrix material which can be deposited from a vapor atmosphere or by pyrolysis of organic coatings, as well known in this art and discussed in the previously mentioned patents.

One of the important properties of reinforcing fibers for ceramic composites is the fiber's tensile strength and particularly its tensile strength and resistance to creep at high temperatures; another is its modulus of elasticity or Young's modulus. Procedures for testing tensile strength of fibers of this type are well known and are set forth in the '814 patent. It has been found that stabilized YAG fibers are structurally strong, exhibiting average tensile strengths of about 2000 megapascals (MPa) or higher. Of considerable importance is the fact that these fibers retain these high tensile strengths even at temperatures of about 1500° C. and above. In addition to tensile strength, another important property is the resistance to high-temperature creep. Stabilized YAG fibers can be produced which show an elongation of less than about 1% under a load of about 100 MPa at about 1500° C. for about 100 hours or even about 300 hours.

Because oxide fibers have a tendency to adhere strongly to ceramic matrix material and to create, as a result thereof, a relatively brittle structure, various coatings have been developed for application to the exterior surfaces of these oxide fibers which preserve the integral character of the fibers and instead create a strong bond between the matrix material and the outer surface of the coating. The preferred coating is boron nitride (BN); however, other materials such as silica, alumina, titania, zirconia, hafnia and yttria, as is well known in this art, can also be used. Preferably a coating of BN between about 0.1 and about 1.0 micron thick is applied, more preferably between about 0.2 to about 0.4 micron, and then the coated fibers are incorporated into ceramic composites by appropriately depositing a ceramic matrix material thereabout. Silicon carbide and silicon nitride are examples of matrix materials that may be employed; however, there are other matrix materials that are well known in this art which can also be employed. An accepted way of testing the creep resistance imparted by such fibers to composites involves the vapor deposition of silicon carbide onto a suitable array of these fibers to create a test bar structure having dimensions of about 10 cm by 0.5 cm by 0.5 cm. Testing of such a structure at temperatures up to about 1500° C. shows that it exhibits creep resistance equivalent to that measured for the individual fibers. Such creep resistance is clearly significantly superior to the creep resistance exhibited by similar silicon carbide matrix test bars made with YAG fibers of the same size and shape but without the nanoparticle boundary pinners that are preferably provided by the conversion of the excess yttrium alkoxide and zirconium alkoxide to yttria-stabilized zirconia, which nanoparticles form outside of the YAG lattice structure.

Although for purposes of illustration, the description has focused upon the production of stabilized YAG fibers, it should be understood that stabilized forms of other similar ceramic oxide fibers can be produced by forming appropriate nanoparticles of a partially stabilized refractory oxide in situ as a part of the pyrolysis-sintering steps of comparable oxide fiber-making processes. The following working examples are provided to illustrate but not to limit the scope of the invention and to demonstrate their usefulness in endowing ceramic composites with high-temperature creep resistance.

EXAMPLE 1

Stock solutions of yttrium isopropoxide having a concentration $8.544 \times 10^{-5}$ mole/g and of aluminum isopropoxide having a concentration $6.332 \times 10^{-4}$ mole/g are prepared. 177.86 grams of the yttrium isopropoxide solution is pipetted into a 500 ml round bottom flask in a nitrogen dry box, and 40 grams of the aluminum isopropoxide solution is added. These stoichiometric amounts give a final ceramic composition of $Y_3Al_5O_{12}$. The solution mixture is refluxed at its boiling point, i.e. about 82° C., under nitrogen for about 1 hour. 12 moles of organic acid is added per mole of yttrium in the form of 8.7662 g of 2-ethylhexanoic acid in an isopropanol solution. A white precipitate forms, and the solution and its precipitate are refluxed for about 2 hours. While this solution is boiling, 0.5471 g of water diluted with 50 ml of isopropanol (6 equivalents of water per mole of yttrium) is subsequently added, and refluxing is continued for an additional 1 hour. The solvent in this solution is removed on a rotary evaporator until a damp white precipitate is obtained. 10 ml of cyclohexane is added to this white precipitate, and swirling causes a clear yellowish, viscous solution to form. This viscous liquid is pipetted into a 20 ml glass vial and further dried in a vacuum oven at about 60° C. for about 48 hours. The viscous solution transforms into a brittle yellowish solid mass when completely dry. The brittle solid mass is ground into a fine precursor powder with a mortar and pestle, and the powder is redissolved in xylene. To obtain the desired viscosity for spinning fibers, xylene is added so that the ultimate solution constitutes 69.4 weight percent precursor powder and 30.6 weight percent xylene. Precursor fibers of about 30–50 $\mu$m in diameter are spun from this viscous solution at a rate of about 15 meters per minute.

EXAMPLE 2

The process of Example 1 is repeated to form the homogeneous stoichiometric mixture of yttrium isopropoxide and aluminum isopropoxide. Then 5 moles of 2-ethylhexanoic acid per mole of yttrium, dissolved in isopropanol, are added dropwise to the boiling solution, and a white suspension and some white precipitate again form. After refluxing for about 2 hours, a water/isopropanol solution is added which constitutes 9.5 equivalents of water per mole of yttrium, and refluxing is continued for an additional 1 hour. The solvent is then removed from this solution on a rotary evaporator until a damp white precipitate is obtained, to which 10 milliliters of cyclohexane is added, and swirling results in a clear yellowish viscous solution. It is dried in a vacuum oven at 60° C. for about. 24 hours and transforms into a brittle yellowish solid mass which is then ground into a fine precursor powder using a mortar and pestle. The powder is calcined at about 300° C. in $N_2$ for an hour in a shallow aluminum crucible and then redissolved in a binary solvent mixture of xylene and isopropanol. To provide the desired viscosity for fiber-spinning, a viscous solution is produced which constitutes 65.7 weight percent precursor powder, 33.0 weight percent xylene and 1.3 weight percent isopropanol. Precursor fibers having a diameter of from about 30 to about 50 microns are spun at a rate of about 15 meters per minute.

EXAMPLE 3

The process of Example 1 is again repeated using the same stock solutions, but using a slight excess of yttrium isopropoxide, i.e. 177.95 grams of yttrium isopropoxide to 40 grams of aluminum isopropoxide. To this solution, 0.18 gram of zirconium n-propoxide is added, and the solution is refluxed at its boiling point under nitrogen for about 2 hours. The amounts of the 3 components employed are calculated to provide 1 mole of YAG, 0.1 mole of $ZrO_2$, and 0.015 mole of $Y_2O_3$. Organic acid is then added dropwise in the amount of 7.31 grams of 2-ethylhexanoic acid in 60 milliliters of isopropanol, which is equivalent to 10 moles of acid per mole of yttrium. A white precipitate forms, and the solution and precipitate are refluxed for about 1 hour. While still boiling, 0.638 gram of water diluted with 50 milliliters of isopropanol, which is equal to about 7 equivalents of water per mole of yttrium, is added to this solution, and refluxing is continued for about 1 hour. The solvent is then removed on a rotary evaporator, and a damp white precipitate is obtained. The addition of 10 milliliters of cyclohexane to the white precipitate and swirling produces a clear yellowish, viscous solution, which is then dried in a vacuum oven at 60° C. for about 24 hours, resulting in its transformation into a brittle yellowish solid mass. The solid mass is ground into a fine precursor powder using a mortar and pestle and is redissolved in cyclohexane and isopropanol to produce a viscous solution suitable for fiber-spinning. The solution constitutes precursor powder 68.2 weight percent, cyclohexane 28.0 weight percent, and isopropanol 3.8 weight percent. Precursor fibers having a diameter of from about 30 to about 50 microns are spun at a rate of about 10 meters per minute.

EXAMPLE 4

The precursor or pre-ceramic fibers from Examples 1, 2 and 3 are then heat-treated by raising their temperatures at a rate of about 5° C. per minute from room temperature to about 300° C. in air while a tension of $6.87 \times 10^{-4}$ newton (about 0.07 g) is applied; they are held at this curing temperature for about 3 hours. The tension is removed, and the temperature is then raised at a rate of about 5° C. per minute under a nitrogen atmosphere to about 950° C., at which temperature they are held for about 5 hours to complete the pyrolysis of the fibers. The microcrystalline YAG fibers are then heat-treated in air, employing a temperature rise of about 20° C. per minute to a sintering temperature of about 1600° C. where they are held for about 30 minutes, and they are then allowed to return to room temperature over a period of about 1 hour.

X-ray diffraction of the resultant fibers of all 3 examples following pyrolysis show a YAG microcrystalline form with substantially all of the crystals being less than about 500 nm in size. After sintering, the microcrystals of YAG from the fibers of Example 3 remain mainly in the size range of from about 300 to about 700 nanometers while the crystals of the fibers of Examples 1 and 2 increase in size. Present at the grain boundaries between the microcrystals of the Example 3 YAG fibers, and particularly at points where 3 microcrystals meet, are minute solid particles of partially yttria-stabilized zirconia from about 1 nanometer to about 5 nanometers in size. The YAG fibers of Example 3 have good structural strength, exhibiting an average tensile strength of about 2000 MPa, and retain this strength at about 1500° C. At about 1500° C., the fibers exhibit an elongation of less than 1% when a load of 100 MPa is applied for from about 50 to 100 hours.

The fibers are used to prepare ceramic composite materials by first coating the fibers with a layer of boron nitride having a thickness of about 0.1–0.3 microns, and then incorporating these coated fibers in a composite made by vapor-depositing a ceramic matrix of silicon carbide in the form of a test bar of about 10 cm $\times$ 0.5 cm $\times$ 0.5 cm. These ceramic composites made using the YAG fibers of Example 3 are compared to similar ceramic composites made in exactly the same manner but using the YAG fibers produced in Examples 1 and 2 without the nanometer-size particles at the grain boundaries. The structural properties of these composites are tested at temperatures up to about 1500° C., and the composites made with the stabilized YAG fibers having these grain boundary pinners exhibit a substantial improvement in resistance to high-temperature creep.

EXAMPLE 5

The process set forth in Example 3 is repeated except that hafnium alkoxide is added instead of zirconium alkoxide to the mixture of yttrium and aluminum isopropoxides. An amount of hafnium isopropoxide dissolved in isopropanol is used so as to provide about 0.1 mole of hafnium oxide in the final stabilized YAG material. As a part of the conversion reactions and firing, the hafnium alkoxide is converted to microcrystals of hafnium oxide, which combine with the stoichiometric excess of yttria to create the partially stabilized $HfO_2$ nanoparticles that are distributed throughout the structure of the YAG fibers in the form of microcrystals of approximately the size range of 1 to 10 nanometers. Testing of the resultant stabilized YAG fibers containing the additional minute particles of partially stabilized hafnium oxide at the grain boundaries shows that they also have superior properties to the fibers of Examples 1 and 2 without the grain boundary pinners.

EXAMPLE 6

The process of Example 1 is repeated, but this time partially MgO-stabilized zirconia particles are added to the mixed alkoxide solution in the form of about 1 to about 5 nanometer particles. The particles are added in an amount so as to provide about one-tenth mole of $ZrO_2$ in the final stabilized YAG fibers. Examination shows these coherent solid particles are located at the YAG grain boundaries and at the triple points. Testing of the resultant stabilized YAG fibers containing these zirconia particles at the grain boundaries shows that they also have superior properties to the YAG fibers without the grain boundary pinners.

EXAMPLE 7

The process set forth in Example 3 is repeated using only the stoichiometric amount of yttrium isopropoxide, but this time a small amount of magnesium isopropoxide is added in an amount equal to about 7 atom percent based upon total atoms of magnesium plus zirconium. During the refluxing, the magnesium and zirconium become associated with each other and become uniformly distributed throughout the otherwise homogeneous solution. The process is generally carried out as described in Example 3 so as to produce stabilized YAG fibers, with the added zirconia and magnesia combining in situ to provide the desired nanoparticles. X-ray diffraction of the resultant fibers shows a YAG microcrystalline structure with minute solid particles of partially MgO-stabilized zirconia at the grain boundaries. These fibers are again used to prepare ceramic composite material as in Example 4, and the structural properties of these composites having the $MgO-ZrO_2$ $ZrO_2$ grain boundary pinners exhibit an improved resistance to high-temperature creep substantially the same as the fibers from the Example 3 process.

In summary, it has been found that such organic solutions of metal alkoxides or the like, when provided with refractory oxide-forming precursors (either independently or as a stoichiometric excess of one of the components that are being employed to form the ceramic oxide material, e.g. YAG), will create relatively small amounts (not greater than about 2 weight percent) of solid, coherent nanoparticles of partially stabilized refractory oxide particles by an in situ formation reaction that strategically locates these nanoparticles at grain boundaries and particularly at triple points within the microcrystalline oxide structure. As a result, YAG or similar ceramic oxide structures are created which exhibit excellent strength and elasticity and very good resistance to high-temperature creep.

Although the invention has been illustrated with regard to certain preferred embodiments, which constitute the best mode presently understood by the inventors for carrying out the invention, it should be understood that various changes and modifications as would be obvious to one having the ordinary skill in this art may be made without departing from the scope of the invention which is defined solely by the claims appended hereto. For example, although the homogeneous alkoxide solution has been described as being formed by refluxing by boiling under nitrogen, other equivalent methods of mixing organic solutions to achieve homogeneity can be used, such as refluxing with dry nitrogen gas. Although hydrolytic decomposition of the metal alkoxide by the addition of water is preferred, thermal decomposition, as generally known in this art, can also be used.

Particular features of the invention are emphasized in the claims that follow.

What is claimed is:

1. A process for preparing microcrystalline $Y_3Al_5O_{12}$(YAG) fibers, which process comprises the steps of
    forming a homogeneous liquid mixture of an organoaluminum compound and an organoyttrium compound wherein said organoyttrium compound is present in at least about the stoichiometric ratio of 3 atoms of yttrium to each 5 atoms of aluminum;
    adding to said mixture a minor amount of a precursor of $ZrO_2$ or $HfO_2$ or minute solid particles of $ZrO_2$ or $HfO_2$ so that zirconia or hafnia is present in an amount in said crystalline YAG fibers of at least about 0.2 weight percent but not more than about 2 weight percent;
    adding an appropriate amount of a precursor of MgO so as to provide MgO in an amount between about 0 and 8.5 atom percent of Mg based upon total atoms of Mg plus Zr or Hf;
    causing said mixture to undergo hydrolytic condensation and polymerization to form a precursor sol gel,
    processing said precursor sol gel into pre-ceramic solid-phase YAG fibers; and
    heating said pre-ceramic fibers at temperatures sufficient to cure and pyrolyze said pre-ceramic fibers and create YAG microcrystals, which heating results in fibers of crystalline YAG having a submicron average crystallite size wherein coherent solid particles of zirconia or hafnia having a size of about 10 nanometers(nm) or less are present at the grain boundaries and the triple points of said YAG microcrystals, which solid particles are partially stabilized with MgO or with yttria.

2. A process according to claim 1 wherein said organoaluminum compound is an aluminum alkoxide and said organoyttrium compound is a yttrium alkoxide.

3. A process according to claim 2 wherein said $ZrO_2$ precursor is added to said mixture and is a zirconium alkoxide.

4. A process according to claim 3 wherein an excess of yttrium alkoxide is employed so as to result in partially $Y_2O_3$-stabilized $ZrO_2$ solid particles.

5. A process according to claim 3 wherein a magnesium alkoxide is added to said mixture in an amount so that said crystalline YAG contains not more than about 2 weight % of partially MgO-stabilized $ZrO_2$ solid particles.

6. A process for preparing fibers of microcrystalline stoichiometric $Y_3Al_5O_{12}$(YAG), which process comprises the steps of forming a homogeneous liquid mixture of an aluminum alkoxide and a yttrium alkoxide wherein said yttrium alkoxide is present in about the stoichiometric ratio of 3 atoms of yttrium to each 5 atoms of aluminum for $Y_3Al_5O_{12}$;

adding to said mixture a minor amount of a precursor of $ZrO_2$ or $HfO_2$ in the form of a zirconium alkoxide or a hafnium alkoxide so that zirconia or hafnia is present in an amount of between about 0.1 and about 2.0 weight percent in the resultant crystalline YAG fibers;

causing said mixture to undergo hydrolytic condensation and polymerization and forming a precursor sol gel therefrom, processing said precursor sol gel into pre-ceramic solid-phase YAG fibers; and heating said pre-ceramic fibers at temperatures sufficient to cure and pyrolyze said pre-ceramic fibers and create YAG microcrystals, which heating results in fibers consisting essentially of microcrystalline stoichiometric $Y_3Al_5O_{12}$ wherein coherent solid particles of zirconia or hafnia having a size of about 10 nanometers or less are present at the grain boundaries and the triple points between said YAG microcrystals and provide improved resistance to high temperature creep.

7. A process according to claim 6 wherein said crystalline YAG contains at least a major portion of microcrystals in the size range of about 300 to about 700 nm.

8. A process according to claim 6 wherein said precursor sol gel is processed to form said pre-ceramic solid phase material in the shape of fibers having a diameter of not greater than about 50 μm and wherein said pyrolyzed fibers are sintered at a temperature of between about 1500° C. and about 1650° C.

9. A process according to claim 6 wherein said homogenous mixture includes an aluminum alkoxide and a yttrium alkoxide in an alcohol solvent, an organic monocarboxylic acid is added to said homogeneous mixture, in an amount equal to at least about 3 moles per mole of yttrium alkoxide to control the active alkoxy groups in the alcohol solution, and then water is added to said mixture to cause said hydrolytic condensation and polymerization.

10. A process according to claim 9 wherein said aluminum alkoxide is aluminum isopropoxide and said yttrium alkoxide is yttrium isopropoxide and wherein said organic acid is 2-ethylhexanoic acid.

11. A process according to claim 6 wherein said pre-ceramic fibers are heated under tension to a curing temperature of between about 250° C. to about 350° C. at a rate of temperature rise not greater than about 7° C. per minute in an atmosphere containing oxygen, wherein said cured fibers are pyrolyzed under an inert atmosphere by heating at a rate of temperature rise not greater than about 7° C. per minute to a temperature of about 900° to about 1050° C. and wherein said pyrolyzed fibers are sintered in air at a temperature of about 1500° C. to about 1650° C. using a rate of temperature rise not greater than about 20° C. per minute.

12. Crystalline YAG fibers made by the process of claim 11.

13. Crystalline $Y_3Al_5O_{12}$(YAG) ceramic fibers having resistance to high-temperature creep, which fibers consist essentially of YAG microcrystals of stoichiometric $Y_3Al_5O_{12}$ and between about 0.1 and about 2 weight percent of partially stabilized $ZrO_2$ or $HfO_2$ solid particles, said YAG microcrystals having an average crystallite size of less than one micron, and said particles being located at the grain boundaries and the triple points between said YAG microcrystals and having a size of about 10 nanometers(nm) or less which particles provide said fibers with improved resistance to high temperature stress compared to YAG ceramic fibers of similar crystallite size without said particles located at the grain boundaries.

14. Ceramic fibers according to claim 13 wherein said fibers contain between about 0.2 and about 1.5 weight % of said partially stabilized $ZrO_2$ or $HfO_2$ particles.

15. Ceramic fibers according to claim 13 wherein said crystalline YAG contains at least a major portion of microcrystals in the size range of about 300 to about 700 nm and wherein said fibers have a density of at least about 95% of the theoretical density of YAG.

16. Ceramic fibers according to claim 13 wherein said crystalline YAG is in the shape of fibers having a diameter of between about 5 μm and about 30 μm.

17. Ceramic fibers according to claim 13 wherein said solid particles are particles of MgO-stabilized $ZrO_2$ which contain between about 6 and about 8.5 atom percent of Mg based upon total atoms of Mg plus Zr and which have a partially tetragonal crystallite structure.

18. Ceramic fibers according to claim 13 wherein said solid particles are particles of $Y_2O_3$-stabilized $ZrO_2$ which contain between about 1.5 and about 3 atom percent of yttrium based upon total atoms of yttrium plus zirconium and which have a partially tetragonal crystallite structure.

19. Crystalline $Y_3Al_5O_{12}$(YAG) ceramic fibers which fibers have diameters of between about 5 μm and about 30 μm and comprise YAG microcrystals having an average crystallite size of less than one micron, said fibers containing between about 0.2 and about 1.5 weight % of partially stabilized $ZrO_2$ particles which contain between about 1.5 and about 3 atom percent of yttrium based upon total atoms of yttrium plus zirconium and which have a partially tetragonal crystallite structure, and said particles being located at the grain boundaries and the triple points between said YAG microcrystals and having a size of about 10 nanometers(nm) or less.

* * * * *